No. 851,075. PATENTED APR. 23, 1907.
S. M. DOBSON.
LAWN MOWER.
APPLICATION FILED MAY 18, 1905.

2 SHEETS—SHEET 1.

WITNESSES
Wm. B. Poor.
F. N. Houston.

Shadrach Miles Dobson.
INVENTOR

BY Ellis Spear
ATTY.

No. 851,075. PATENTED APR. 23, 1907.
S. M. DOBSON.
LAWN MOWER.
APPLICATION FILED MAY 18, 1905.

2 SHEETS—SHEET 2.

WITNESSES
Wm. B. Pour.
F. N. Houston.

Shadrach Miles Dobson. INVENTOR
BY Ellis Spear Jr.
ATTY.

UNITED STATES PATENT OFFICE.

SHADRACH MILES DOBSON, OF PORTLAND, MAINE.

LAWN-MOWER.

No. 851,075.            Specification of Letters Patent.            Patented April 23, 1907.

Application filed May 18, 1905. Serial No. 260,982.

*To all whom it may concern:*

Be it known that I, SHADRACH MILES DOBSON, a citizen of the United States, residing at Portland, in the county of Cumberland and State of Maine, have invented certain new and useful Improvements in Lawn-Mowers, of which the following is a specification.

The subject-matter of the present invention is an improvement in lawn mowers, the object of which is to provide certain new and useful constructions in the driving mechanism and certain other improvements in the structure and adjustment of the different parts, as will be more fully described hereinafter.

Figure 1:
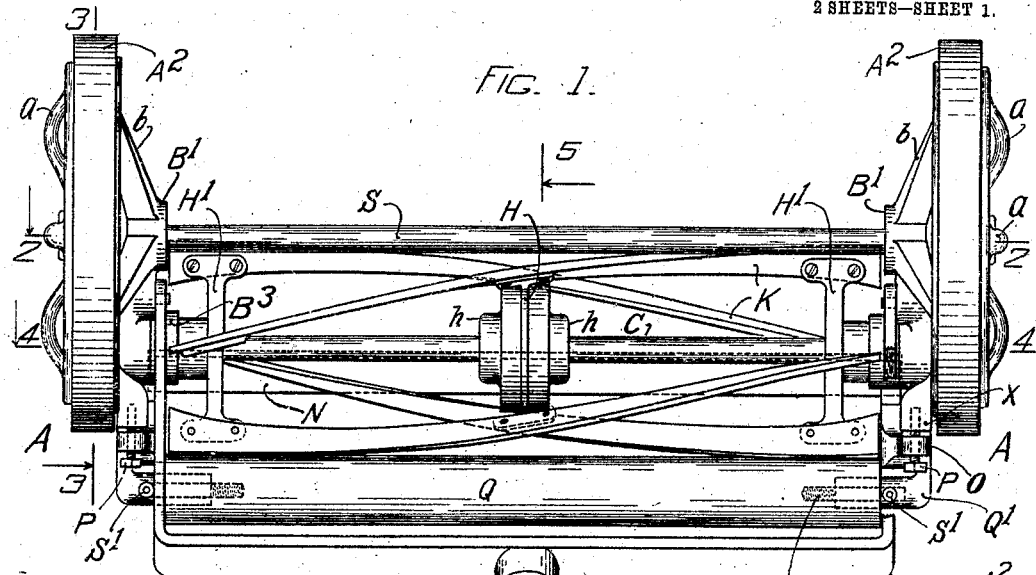
Figure 2:
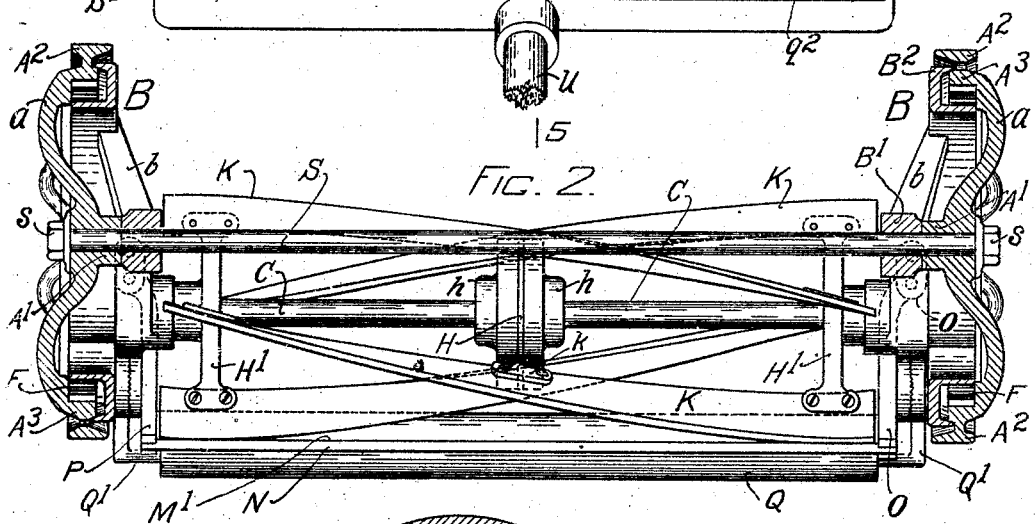
Figure 3:
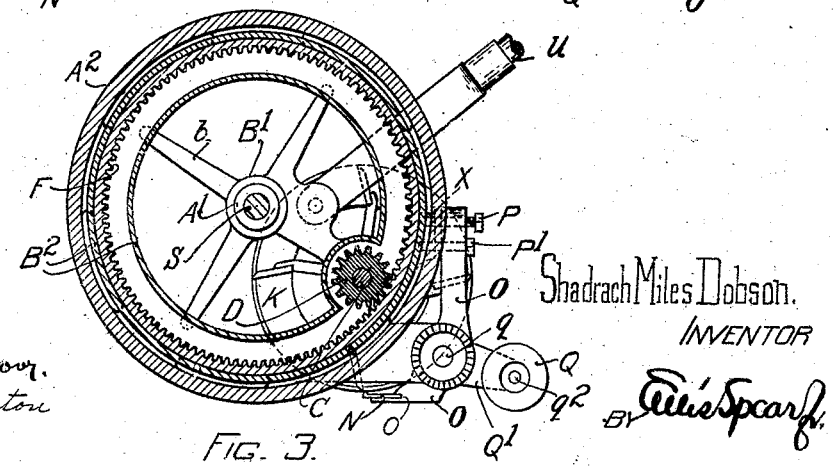
Figure 4:
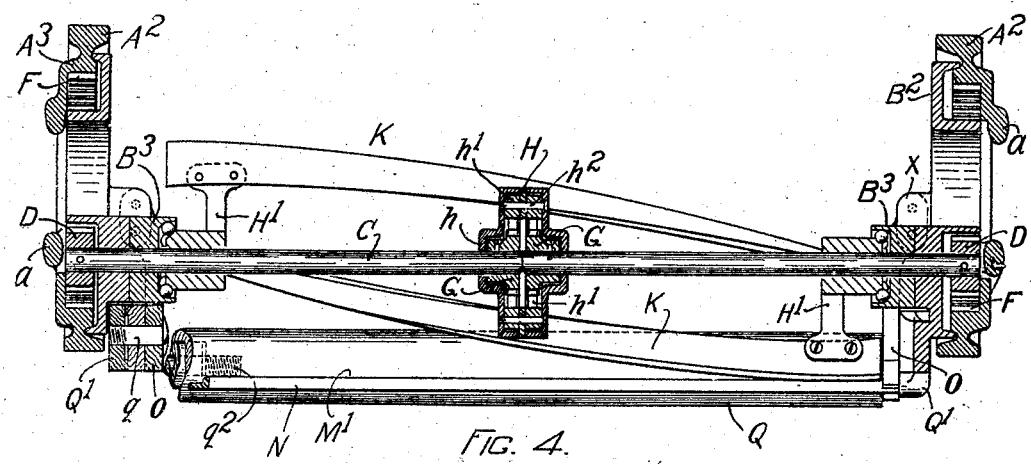
Figure 5:
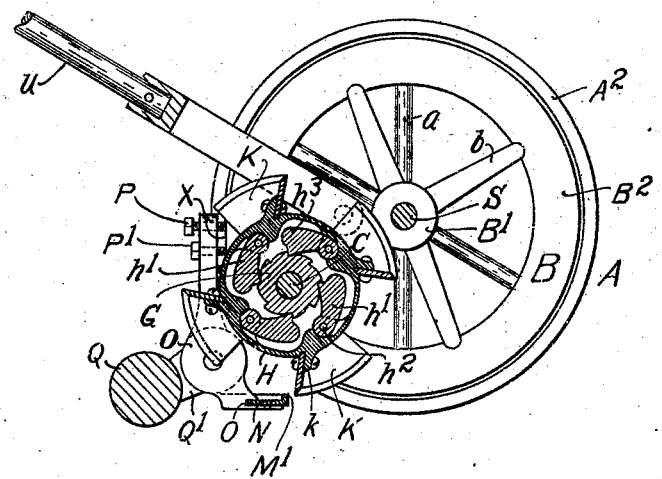
Figure 6:
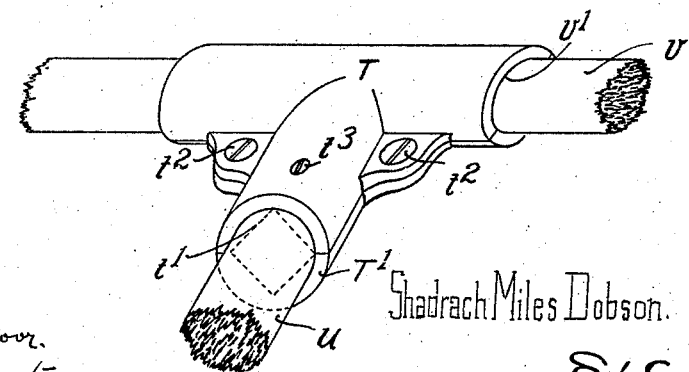

In the drawings in which like letters of reference indicate corresponding parts throughout:—Figure 1, is a plan of the machine. Fig. 2, is a section on the line 2–2 of Fig. 1, Fig. 3, is a section on the line 3–3 of Fig. 1, Fig. 4, is a section on the line 4–4 of Fig. 1, Fig. 5, is a section on the line 5–5 of Fig. 1, and, Fig. 6, is a detail of the handle.

In referring to the drawings, the reference letter A represents the wheels of the lawn mower freely mounted on a stationary shaft S, and held thereon by a washer and nut $s$. These wheels consist of an outer rim $A^2$, which forms the tread and an inner rim $A^3$, which has an internal gear and is connected to said outer rim by short webs or spokes. The inner rim is in turn connected to and supported by the hub $A^1$, through spokes $a$.

B is a spider frame having a hub $B^1$ firmly mounted upon the stationary shaft S and bearing by spokes $b$ a guard rim $B^2$, which surrounds the inner rim $A^3$ of the wheel A and protects the gear thereon from dirt or grass.

C are a pair of counter-shafts arranged in alinement end to end, which carry pinions D on their outer ends, which pinions mesh with the internal gear F on the inner rim $A^3$, and are positively driven thereby. The shafts C have bearings near their outer ends in one of the legs of the spider frames B, which are thickened and bored for that purpose and fitted with ball bearings $B^3$ screwed therein. The bore of this thickened portion of the spider leg is machined out on the wheel side to form a casing for the pinions D. G are ratchet wheels mounted on the inner ends of said shafts C and contained within the casing H, which forms a part of the cutter head and supports the cutter knives K centrally by ears $k$.

The casing H is made in two parts, having a bearing in each part, as at $h$, for the ends of the shafts just inside the ratchets, thus preserving the alinement of the shafts while permitting them to move independently. The casing is provided with pawls $h^1$ pivotedly mounted therein in pairs to engage with the ratchet wheels on the ends of the two shafts C. The ratchets are arranged to engage the parts when the machine is driven ahead to actuate the cutters. The pawls $h^1$ are pivoted at $h^2$ and at their opposite ends are enlarged and made heavier, as at $h^3$.

$H^1$ are the end bearings of the cutter carriage, which support the ends of the blades and which are loosely mounted to freely revolve on the shafts C. The outer ends of these bearings $H^1$ are coned to co-act to the ball bearing $B^2$, which takes up the end thrust of the cutter carriage as well as forming the bearings for the shafts C.

N is the stationary cutter blade having an upwardly turned lip $M^1$, said blade being set in a deep groove $o$, in an L shaped arm O and removably held therein. The arm $o$ is pivoted at $q$ to an extension X of the spider frame, and has oppositely acting adjusting screws P $P^1$ for regulating its position, which screws are in and against a portion of the same spider.

Q is the gage roller mounted upon an adjustable arm $Q^1$ and pivoted at $q$ to the same extension of the spider as is the cutter arm O. Between the adjustable arm $Q^1$ and the adjoining face of said extension, are oppositely faced notches cut radially about the pivot bolt $q$. These notches on the two parts co-act to hold the roller arm in its proper adjustment when the parts are tightened upon the bolt $q$. The roller Q is bored at each end to receive the end of the arm $Q^1$, which is in turn bored to receive the roller bearing $q^2$ screwed into the end of the roller within said first mentioned bore. An oil cup $S'$ is mounted upon the arm $Q^1$ and connects with the bore above mentioned and supplies lubricant to this bearing without allowing dirt to gain access thereto.

T $T^1$ is a clamp for uniting the shaft of the handle $u$ with its crossbar $v$. This clamp has a squared portion $t^1$ for receiving the end of the shaft $u$ and a cross tubular portion $v^1$ for the crossbar $v$. Bolts $t^2$ passing outside of the bars hold the parts T $T^1$ together, and a bolt $t^3$, through the casing and shaft $u$ holds the clamp firmly thereon.

The handle is connected by the usual fork to lugs on the inside of the spider frames B, being sprung onto the same, so that they are readily removable.

The operation of the machine is as follows, the various parts being properly adjusted in the manner indicated. As the machine is pushed forward the rotation of the wheels A impart through the internal gear F and the pinions B a positive motion to the shafts C. When the cutters are started the ratchets G engage the pawls $g$ and turn the casing H which carries with it the cutters. As long as the machine is driven ahead the pawls are held in engagement with the ratchets, but as soon as either shaft is stopped or is retarded the pawls are released and the rapid motion of the cutter casing causes them to be thrown out and thus tend to remain, while the head is in rotation out of contact with the ratchet wheels. If both of the driving wheels A are stopped, both ratchets stop, or if the wheels A are reversed, the ratchets also are reversed, but the cutters being freed from resistance, continue to rotate rapidly and thus tend to throw off the pawls, as above described and avoid the constant wear to which these parts are usually subjected.

Various modifications in the forms and the arrangements of the parts hereinbefore specified, may obviously be made, without departing from the spirit of my invention.

What I therefore claim and desire to secure by Letters Patent, is:—

1. In a lawn mower, the combination with a pair of driving wheels of a counter-shaft having two parts independently driven thereby, a cutter carriage mounted on said two part shaft and ratchet connections between each of said parts of said shaft and said cutter carriage, substantially as and for the purpose specified.

2. In a lawn mower, the combination with a pair of driving wheels of a counter-shaft having two parts independently driven thereby, said parts having on their adjacent ends ratchet mechanisms, a casing having bearings for said adjacent ends and provided with independent ratchet mechanisms co-acting with said first named mechanisms and cutter blades operatively connected with said casing.

3. In a lawn mower, a counter-shaft having two independently driven portions with ratchets on their adjacent ends, a casing for said ratchets provided with bearings for said portions, said casing being provided with pawls adapted to co-act with said ratchets and cutter blades operatively connected with said casing.

4. In a lawn mower, a positively driven shaft having a ratchet, a cutter carriage mounted thereon and having a pivoted pawl adapted to be thrown outward by the rotation of said carriage when said ratchet is stopped.

5. In a lawn mower, a counter-shaft having two independently driven portions with ratchets on their adjacent ends, a casing for said ratchets provided with bearings for the portions, said casing being provided with pivoted pawls adapted to be engaged by said ratchets in their forward motion and to be thrown outward by the motion of the casing when said ratchets are retarded, and cutters operatively connected with said casing.

6. In a lawn mower, a counter-shaft having two independently driven portions with ratchets on their adjacent ends, a cutter head loosely mounted on said shaft and comprising a casing for said ratchets having bearings for said portions and said casing being provided with pivoted pawls adapted to be engaged by said ratchets in their forward motion and to be thrown outward as the ratchets are retarded, and cutters operatively attached to said head substantially as and for the purpose specified.

7. In a lawn mower, a positively driven shaft having a ratchet, a cutter carriage mounted thereon and having a pivoted pawl, said pawl being weighted at its free end whereby it will be moved centrifugally by the rotation of said carriage when said ratchet is stopped.

8. In a lawn mower, a pair of positively driven shafts having ratchets, a cutter carriage mounted thereon and having pivoted pawls, said pawls being weighted at their free ends whereby they will be moved centrifugally by the rotation of said carriage when said ratchets are stopped.

In testimony whereof, I affix my signature in presence of two witnesses.

SHADRACH MILES DOBSON.

Witnesses:
   WILLIAM J. KNOWLTON,
   MARION L. DUNBAR.